J. McGEORGE.
LATHE DOG.
No. 183,408. Patented Oct. 17, 1876.
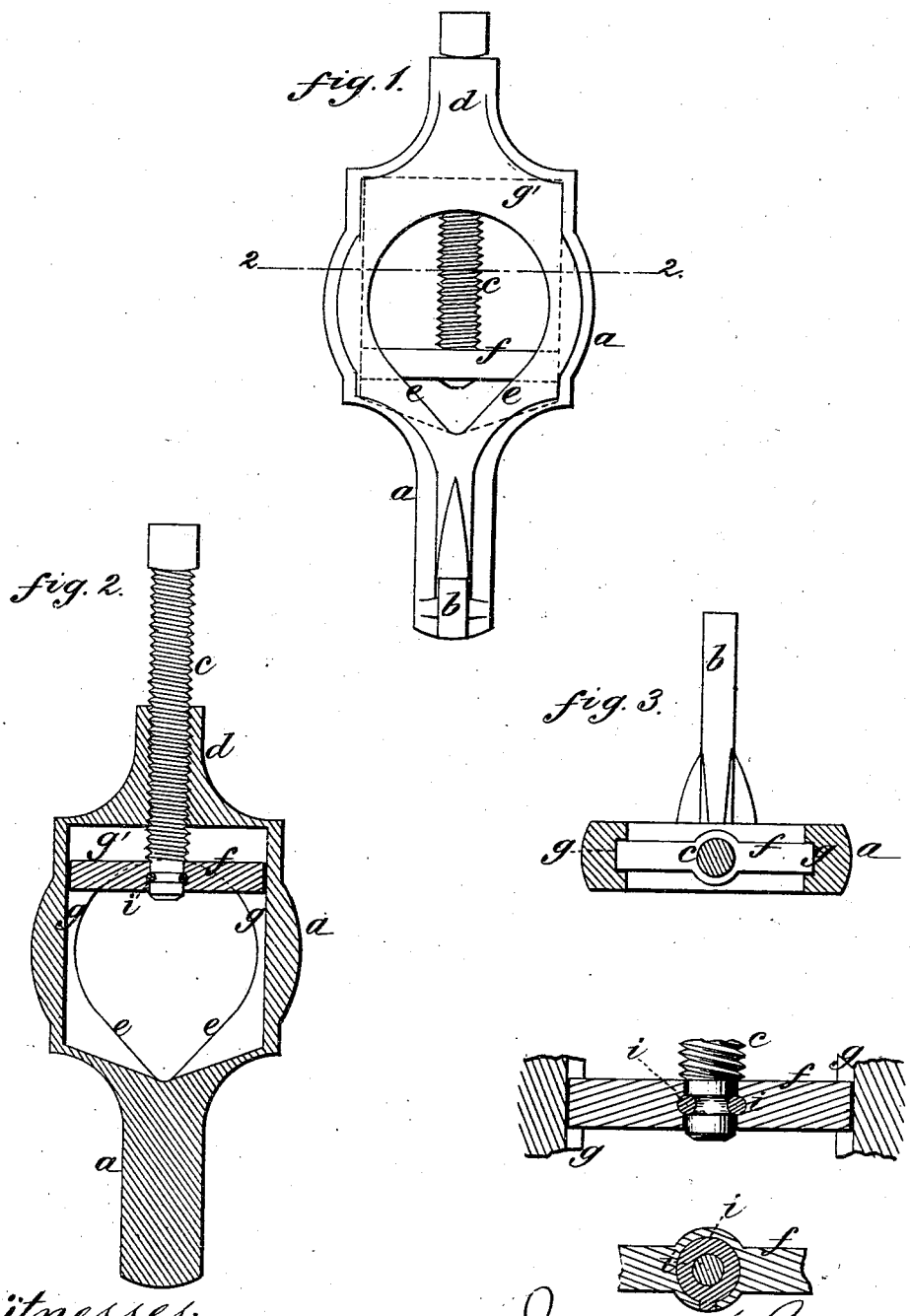

UNITED STATES PATENT OFFICE.

JAMES McGEORGE, OF BELLAIRE, OHIO.

IMPROVEMENT IN LATHE-DOGS.

Specification forming part of Letters Patent No. 183,408, dated October 17, 1876; application filed June 27, 1876.

*To all whom it may concern:*

Be it known that I, JAMES McGEORGE, of Bellaire, in the county of Belmont and State of Ohio, have invented certain new and useful Improvements in Lathe-Dogs, of which the following is a specification:

My object is to improve the lathe-dog in which the griping-screw is combined for use with an opening which converges to a point at its base and forms griping sides, the design being to adapt this form of dog to hold a greater variety of sizes of articles to be turned, by combining with the griping end of the screw and the converging sides of the opening a cross-brace attached to the end of said screw and carried by it, for the purpose of bracing the screw to its vertical griping position, and thereby avoiding twisting strain and permitting of a longer projection into the opening.

In the accompanying drawings, Figure 1 represents an elevation of a lathe-dog embracing my invention; Fig. 2, a section of the same through the axis of the griping-screw, and Fig. 3 a cross-section of the same at the line 2 2 of Fig. 1.

The frame $a$ of the dog or carrier is provided with a tail or shank, $b$, by which it is hung in the lathe plate or chuck, as in ordinary dogs, to revolve the article to which the dog is attached, and it has the usual griping-screw $c$, which passes through a female screw formed in a neck, $d$, extending outside of the frame. The opening in the frame has converging sides $e$ $e$, which form a base or wedge-point upon which the article is clamped by the screw.

This form of opening adapts the dog for articles of different sizes. When, however, a small article is to be griped by the screw, the latter must extend into the opening, so that its griping-point will be at a considerable distance from its threaded socket, and thereby be subjected to great strain and liable to twist, especially if the dog should slip upon its holding-shank, as in Fig. 1. To avoid this contingency, and adapt the screw to gripe small size articles, I have combined with the screw and the converging sides of the opening a cross-brace, $f$, attached to the griping end of the screw and moving with it in guides $g$, in the inner sides of the dog. These guides extend from the griping-point to the top of the opening, so that the cross-brace can enter the head of the dog-frame at $g'$, and extend to the base with the screw, to adapt the latter to gripe a variety of sizes of articles and hold them firmly upon the inclined sides of the opening, while the ends of the cross-brace $f$, being in contact with the sides of the guides, will give a firm support to that portion of the screw extending within the opening, and prevent all liability of being bent or twisted in case the dog should slip.

The cross-brace is secured to the end of the screw by forming a groove in each and filling the space formed thereby with Babbitt metal, so as to make a good fit and a bearing, $i$, all around, and to allow the screw to be turned in and out and carry the brace with it.

The griping sides, by reason of the guides, form ribs which give a better hold of the dog-frame upon the article than if the inner surface of the opening were plain.

There is no strain upon the cross-brace in the direction of the screw, as the ends of the brace are simply held in place by the sides of the guides.

The dog is made of malleable iron or steel, with steel griping-screw. The brace-bar adds no perceptible weight to the dog, while its function is to render the screw more durable, and to preserve its true line; for, should it become out of line, it is thereby made inoperative in its screw-socket.

I claim—

1. The combination, with the dog or carrier $a$, having the converging open sides $e$ $e$ and the griping-screw $c$, of the cross-brace $f$, attached to the end of said screw and carried by it, as and for the purpose described.

2. The dog-frame or carrier $a$, provided with grooved guides $g$, forming griping double ribs, and combined for use with the cross-brace $f$ and the griping-screw, as described.

In testimony whereof I have affixed my signature in presence of two witnesses.

JAMES McGEORGE.

Witnesses:
P. T. KING,
W. B. GILMOR.